A. J. MICKLEY.
PISTON.
APPLICATION FILED AUG. 6, 1915.
1,173,727. Patented Feb. 29, 1916.
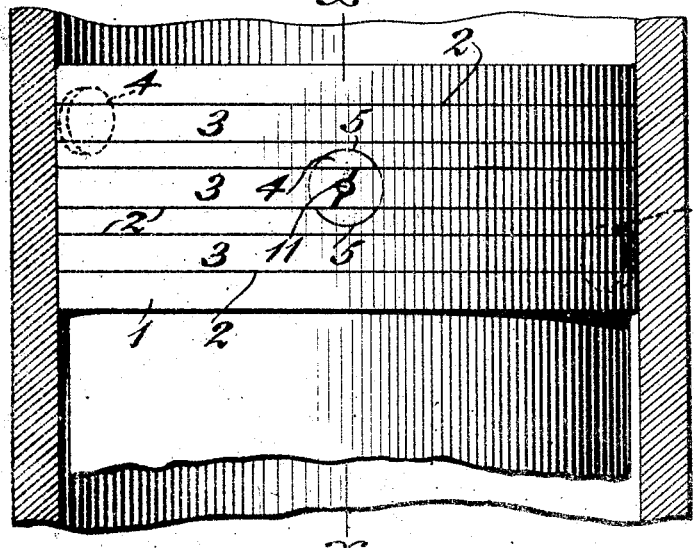
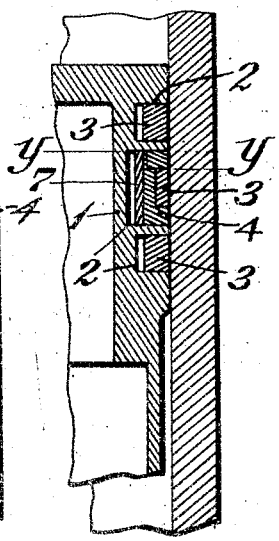
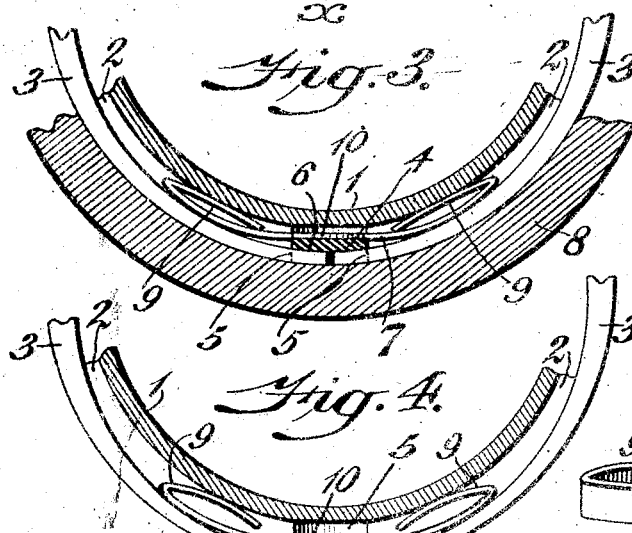
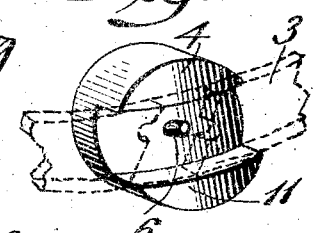
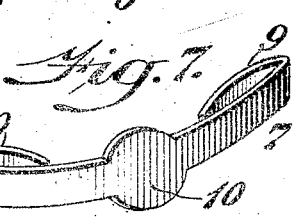
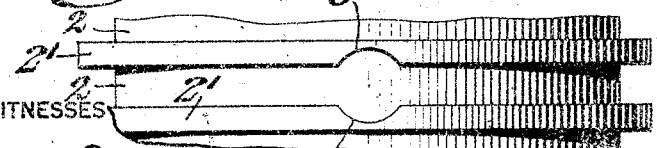
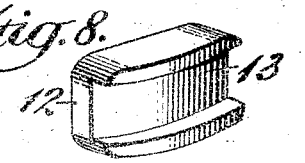
WITNESSES
INVENTOR
Albert J. Mickley
BY
ATTORNEYS

UNITED STATES PATENT OFFICE.

ALBERT J. MICKLEY, OF NEW YORK, N. Y.

PISTON.

1,173,727.      Specification of Letters Patent.      Patented Feb. 29, 1916.

Application filed August 6, 1915. Serial No. 43,967.

*To all whom it may concern:*

Be it known that I, ALBERT J. MICKLEY, a citizen of the United States, residing in the city and county and State of New York, have invented a new and useful Piston, of which the following is a specification.

My invention consists of means for steadying or centering a piston in its cylinder, and also for preventing leakage of the ring of a piston at the joints thereof, the same embodying a seal or sealing member in which the end portions of a ring are slidingly received and embraced and so closing the joint of the ends of the ring, or the sections thereof, and a resilient device adapted to force said seal firmly against the cylinder walls and the rings and so hold the latter, especially at their joint, tightly against the cylinder in which the piston is operative, thus also preserving the closed joint of the ring when the latter expands or contracts.

The invention is satisfactorily illustrated in the accompanying drawing, but the important instrumentalities thereof may be varied, as long as they are included in the scope of the claims.

Figure 1 represents a side elevation of a portion of the piston embodying my invention including a longitudinal portion of the cylinder thereof. Fig. 2 represents a section thereof on the line $x$—$x$ Fig. 1. Fig. 3 represents a section thereof on the line $y$—$y$ Fig. 2. Fig. 4 represents a section similar to Fig. 3, (omitting the cylinder) with seal and ring in expanded position. Fig. 5 represents a side elevation of a portion of the piston, the ring, seal and spring having been removed therefrom. Fig. 6 represents a perspective view of one of the seals and the terminal portions of the contained ring. Fig. 7 represents a perspective view of one of the springs or resilient devices employed. Fig. 8 represents a perspective view of another form of the seal employed.

Similar numerals of reference indicate corresponding parts in the figures.

Referring to the drawings, 1 designates the head of a piston, the same excepting the features of my invention applied thereto being of known construction. The grooves 2 between the flanges 2' of the sides of said head are occupied by the piston rings 3, the terminals of each of which are fitted into the blocks 4, which are intended to seal or close the joints at the terminals of the several rings, said blocks 4 being of the form of studs cylindrical, as in Figs. 1, 2, 3, 4, and 6, or oblong as in Fig. 8, it being noticed that the edges of opposite flanges at registering places are formed with counterbores as at 5, in which said blocks or seals are free to slide in radial direction, and that the outer faces of the latter are formed with passages 6 extending into the same to receive freely the ends of the rings, so that the rings are free to expand circumferentially while the joints of their ends are enveloped or embraced by the walls of the studs at the top, rear and bottom of said passages 6.

In the existing spaces in the grooves 2 between the backs of the rings 3 and the adjacent outer portions of the piston head are fitted the springs 7 which bear against the backs of the seals, and the adjacent portions of the side of the piston head, and so exert pressure on said seals, and consequently on the rings, whereby the rings and seals are both held tightly on the wall of the cylinder 8, in which the piston is operative. The springs are preferably flat plates of suitable resilient material with their ends bent into the form of loops 9 whose function is hereinafter described. At the central portions of the springs are heads 10 which accord with the cylindrical form of the seals 4, said heads being placed in contact with the backs of said seals and seated in the counterbores 5 with said seals. Projecting from the seals at the base of the passages 6 therein are the studs 11, and the terminals of the rings are formed with recesses, shown in dotted lines Fig. 6, to receive said studs when the terminal portions of the rings are fitted in the seals, thus preventing displacement of the rings from the seals, and as the latter and the heads 10 of the springs 7 are seated in the counterbores 5 of the flanges of the piston head, it is evident that displacement of said springs and seals from their operative positions on the piston head is prevented, the terminal portions of the rings being, however, adapted to play in the passages of the seals due to the expansion and contraction of the rings, and the wabbling of the piston. The loops 9 of the springs 7 also exert pressure on the portions of the rings outside of the seals, and so cause the rings to contact tightly with the cylinder, the effect of which is evident.

In Fig. 8, the seal is shown in oblong form as at 12, and the passage 13 is correspondingly shaped, it being evident that the counterbores in the flanges of the piston head will be oblong instead of semicircular, as in Fig. 5, without, however, producing different results. In cylinders of large diameters and where rings are made in sections, several seals may be used and the joints of the sections covered by the same. Attention is directed to the fact that in the invention presented, no change in form of section, or otherwise of the rings now in general use is required. The loops 9 of the springs 7 are not in simple compression. When said springs are relaxed, they assume the form shown in Fig. 4, but when pressure is exerted on the same, the ends of the loops close against the body, see Fig. 3. Further pressure sets up a rolling motion of the loops on the piston, and this reacts at the center of the spring as at 10. The spring not only holds the seal and the piston ring to the cylinder wall, but acts as a balance, and equalizes the pressure of the various members against said wall. In other words, the effort of the spring is not concentrated at any one spot which would tend to gall or score the cylinder or cause the same to wear out of its rotundity. An increase of the load at the terminals of the springs reacts at the center of the latter and vice versa. The heads 10 of the springs are intended to fix the location of the springs in the piston. They also strengthen the springs at what would be otherwise weak parts of the same, and give additional support to the seals.

Having thus described my invention what I claim as new and desire to secure by Letters Patent, is:—

1. In a piston, a ring, a sealing member for the joint of said ring, and a resilient device, the latter being composed of a body of resilient material having a head adapted to exert pressure on said sealing member and loops on extended ends thereof, said loops being adapted to bear against the piston wall and the ring, and said body to exert its pressure on said sealing member.

2. In a piston, a ring, a sealing member for the joint of said ring, and a resilient device, said device being composed of a body of resilient material adapted to bear against the piston wall and ring and having a head adapted to exert pressure on said sealing member.

3. In a piston, a piston head having peripheral grooves, rings in said grooves, blocks into which the terminals of said rings are fitted, the edges of opposite flanges of the groove being counterbored to slidingly receive said blocks, the outer faces of said blocks being formed with passages for said terminals, and springs in said grooves between the backs of the rings and the adjacent outer walls of said piston head, said springs having heads intermediate their ends bearing against the backs of the blocks and the adjacent walls of the counterbore and exerting pressure on said blocks and rings.

4. In a piston, a piston head having peripheral grooves, rings in said grooves, blocks into which the terminals of said rings are fitted, the edges of opposite flanges being counterbored to slidingly receive said blocks, the outer faces of said blocks being formed with passages for said terminals, and springs in said grooves between the backs of the rings and the adjacent outer walls of said piston head, said springs having heads intermediate their ends bearing against the backs of the blocks and the adjacent walls of the counterbore and exerting pressure on said blocks and rings, said springs having extended ends formed with loops to force the rings into close contact with the inner walls of the cylinder.

ALBERT J. MICKLEY.

Witnesses:
WILLIAM N. SHANNON,
CHAS. K. HEINTZ.